United States Patent [19]

Simay

[11] Patent Number: 4,669,431
[45] Date of Patent: Jun. 2, 1987

[54] INTERNAL COMBUSTION ENGINE WITH DUAL COMBUSTION CHAMBERS

[76] Inventor: Stephen Simay, 200 N. Maple St., Ellensburg, Wash. 98926

[21] Appl. No.: 824,396

[22] Filed: Jan. 23, 1986

[51] Int. Cl.$^4$ ............................................. F02B 23/00
[52] U.S. Cl. ................................ 123/193 P; 123/661; 123/671
[58] Field of Search ............... 123/657, 661, 671, 276, 123/279, 193 R, 193 P

[56] References Cited

U.S. PATENT DOCUMENTS

| | | | |
|---|---|---|---|
| 2,644,433 | 7/1953 | Anderson | 123/276 |
| 2,881,743 | 4/1959 | Holt | 123/276 |
| 4,324,214 | 4/1982 | Garcea | 123/661 |
| 4,541,377 | 9/1985 | Amos | 123/193 P |
| 4,557,231 | 12/1985 | Thery | 123/671 |
| 4,572,123 | 2/1986 | Evans | 123/661 |
| 4,586,465 | 5/1986 | Krogdahl | 123/193 P |

FOREIGN PATENT DOCUMENTS 145808 11/1979 Japan ................ 123/193 P
146015 9/1982 Japan ................ 123/661

Primary Examiner—Craig R. Feinberg
Attorney, Agent, or Firm—Sughrue, Mion, Zinn, Macpeak and Seas

[57] ABSTRACT

A spark-ignition overhead valve type internal combustion engine has its cylinder or cylinders closed at the top by semispherical cylinder heads with the piston terminating in a crown of semispherical configuration sized slightly smaller than that of the cylinder head. Shallow recesses within the piston crown to opposite sides of spark plug apertures form dual combustion chamber with a recess within the piston crown aligned with and facing the cylinder head aperture, forms an initial ignition area, with shallow narrow grooves leading from the initial ignition area, within the piston crown, to the shallow combustion chamber defining recesses. The burning process of a fuel-air charge is slowed from the initial ignition area through the shallow grooves and then through the shallow combustion chambers to retard the explosion process.

8 Claims, 5 Drawing Figures

INTERNAL COMBUSTION ENGINE WITH DUAL COMBUSTION CHAMBERS

FIELD OF THE INVENTION

This invention relates to internal combustion engines of the overhead cam, spark ignition type, and more particularly, to such internal combustion engines utilizing a semi-spherical cylinder head and having a reciprocating piston therein with the top of the piston correspondingly shaped.

BACKGROUND OF THE INVENTION

Attempts have been made to create internal combustion engines of the overhead valve, spark ignition type utilizing semi-spherical cylinder heads, and wherein the top of the reciprocating pistons are at least partially of semi-spherical form.

U.S. Pat. No. 3,154,061 is exemplary of this approach. In such engines, a fuel and air mixture is prepared externally of the engine and is compressed in the cylinder prior to being ignited by an electric spark normally from a spark plug mounted to the cylinder head.

This approach has been taken since it is known that the power output and thermal efficiency of an internal combustion engine of this type increases with the compression ratio up to a certain limit characterized by the occurrence of abnormal combustion, namely, the detonating or explosive combustion. This is produced as a result of a pressure wave associated with the combustion wave and causing ignition of the fuel carborized mixture as a consequence of the pressure increment propagated thereby and also as a result of the temperature increase attending that compression. This phenomena is undesirable as it causes considerable drop in engine output and is also may result in serious mechanical engine failure.

To resist premature detonation of the fuel-air mixture within the combustion chamber or chambers, in U.S. Pat. No. 3,451,061, and cylinder in the internal combustion engine disclosed in that patent terminates at the top by a substantially semi-spherical cylinder head in which the combustion chamber proper is formed. The combustion chamber is bound laterally by a regulated surface of a frustoconical or substantially frustoconical configuration and at the top by two faces constituting its bottom, and internally by the semi-spherical piston crowning. In such structure, the exhaust valve seat orifice and the ignition spark plug hole open in each one of the bottom faces of the chamber respectively. The face receiving the exhaust valve seat is substantially perpendicular to the center axis of the frustoconical surface and the face receiving the spark plug hole is inclined to the axis. Additionally, the plane of the inlet valve seat orifice is tangent to the lateral surface of the chamber of which the regulated structure permits the joining of the surfaces along a straight line which is both a straight line of the tangent plane and a generatrix of the chamber wall.

As a result, the flow of gaseous jets generated by the piston movement is facilitated along the cylinder head.

Further, the piston crown is shaped to accommodate the semi-spherical configuration of the cylinder head by being formed with a pair of geometrically separate oblique truncations joined along an edge line extending at right angles to the piston axis with one of the truncations opposite to the inlet valve. That truncation consists of a flat face parallel to the plane of the valve and nearly contacting the same in the piston top dead center position. The other truncation, registering with the combustion chamber proper, consists of a flat face parallel to the plane of the exhaust valve and which takes the form of a shallow recess in the region opposite the spark plug in order to provide the maximum combustion volume for the flame front when ignition is initiated. Further, the exhaust valve and the spark plug are situated in the combustion chamber in a plane at right angles to the plane formed by the axes of the two inlet and exhaust valves.

Other methods have been proposed to increase the resistance to detonation in such internal combustion engines. Some of the methods consist in providing a geometrical configuration to the combustion chamber in order to combine a progressive combustion with a strong cooling of that portion of the gaseous charge which is last burned. It has been shown that it is advantageous to use a compact combustion chamber, that is, a chamber so designed that the quotient of the surface area of its walls to the inner volume is as small as possible, and on the other hand, the advantage resulting from the positioning of the ignition plug at the hotest point so that the hot zone is not that of the last burning gaseous charge portion.

Other means for increasing the resistance to detonation are based on the effecting high turbulence of the gaseous mixture while taking advantage of the possibility of cooling any gas likely to produce an explosion.

U.S. patents representative of these approaches or methods of solving the undesired detonation or explosive combustion are U.S. Pat. Nos. 1,897,234; 2,767,695; 2,826,185; 2,843,103; 4,235,203; 4,259,933; 4,291,662; 4,300,399; and 4,324,214.

While a number of these methods are successful as indeed occurs using the teachings of U.S. Pat. No. 3,154,061, discussed in detail above, the structures are complicated, expensive, require severe modification of either or both the piston and the cylinder head, and tend to reflect adversely on attainable power and combustion efficiency.

It is, therefore, a primary object of the present invention to provide an improved internal combustions engine of the overhead cam, spark ignition type, which utilizes a semi-spherical cylinder head and piston whose top is correspondingly semi-spherical and sized to that of the cylinder head, which provides a very high compression ratio, which is devoid of knock, which maximizes engine output, and eliminates serious mechanical engine failure as a result thereof.

SUMMARY OF THE INVENTION

The invention is directed to a spark-ignition, overhead valve type internal combustion engine having a cylinder closed at the top by a semi-spherical cylinder head and a piston reciprocating within the cylinder. The piston, cylinder and cylinder head define at least one combustion chamber. The cylinder head includes an intake valve aperture, an exhaust valve aperture and a spark plug aperture with a spark plug within the spark plug aperture. The intake valve and the exhaust valve are mounted for reciprocation within the intake valve aperture and the exhaust valve aperture, respectively, with the valves having heads seated on the aperture and opening towards the piston.

The improvement resides in the piston terminating in a crown of semi-spherical configuration, sized slightly smaller than that of the cylinder head and forming a squish area over its semi-spherical surface with the semi-spherical cylinder head. Shallow recesses are provided within the piston crown to opposite sides of the spark plug aperture and the spark plug to form dual combustion chambers and a recess within the piston crown in line with and facing the cylinder head aperture, forms an initial ignition area. Further, shallow narrow grooves within the piston crown extend from the initial ignition area defining recess to the shallow combustion chamber defining recesses. The shallow recesses within the piston crown may be of generally rectangular plan configuration and have a width and height on the order of the diameter of the valve head and being aligned with and opposite the intake valve and the exhaust valve, respectively. The grooves may extend from the recess defining the initial ignition area to the recesses to opposite sides thereof in straight line fashion, may be of V-shape, U-shape or rectangular shape in cross-section. Further, the grooves may comprise essentially right angle branches which are linked and form a joint communication path between the initial ignition area defining recess and the combustion chamber recesses and with branches open at opposite ends to diametrically opposed sides of the recess forming the initial ignition area and the recesses forming the combustion chambers to opposite sides of the piston crown center plane.

DESCRIPTION OF THE PREFERRED EMBODIMENTS

Figure 1:
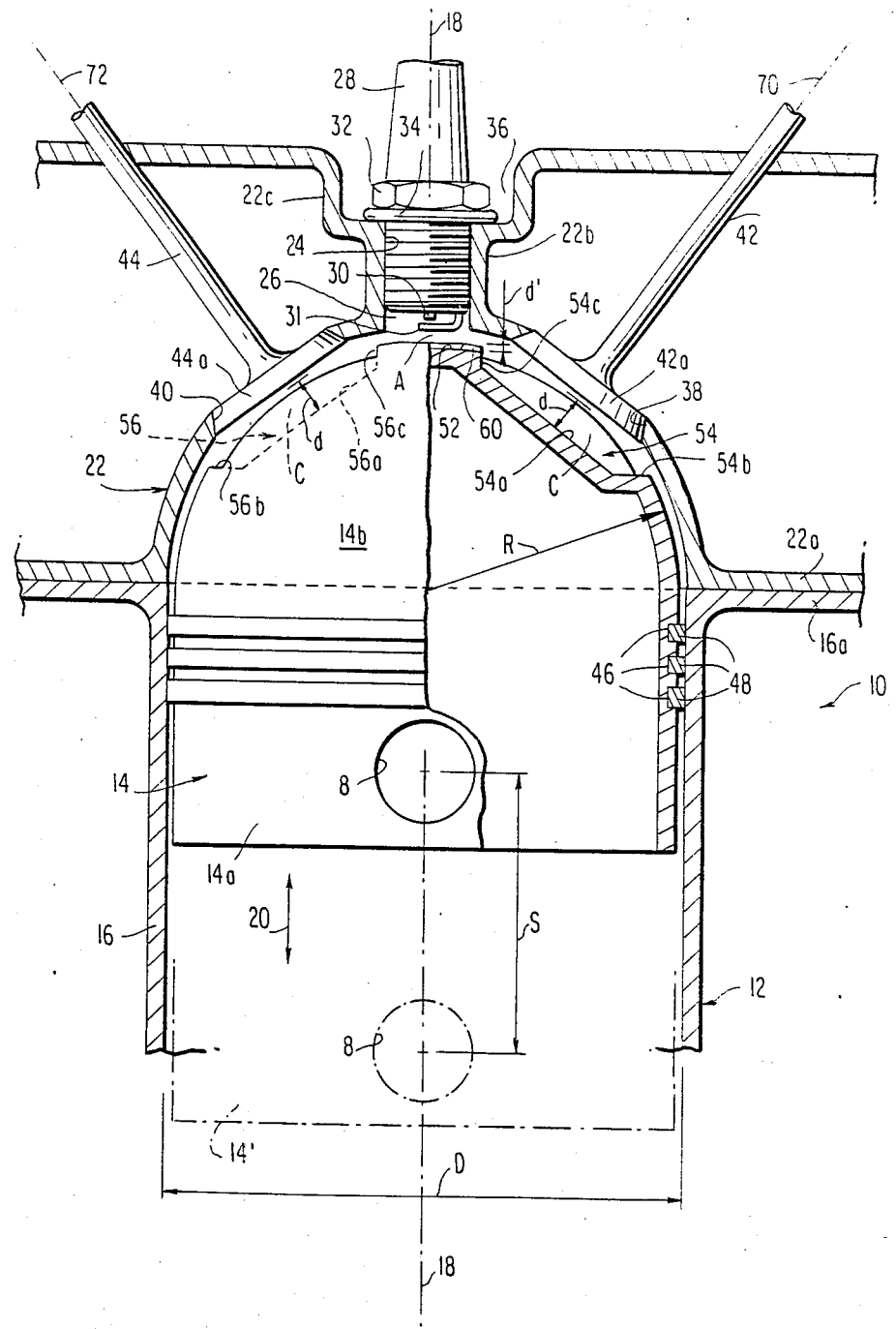
FIG. 1 is a vertical sectional view of one cylinder of an internal combustion engine forming a preferred embodiment of the invention along a plane intersecting the inlet valve, the exhaust valve and the spark plug, with the piston at top dead center position.
Figure 2:
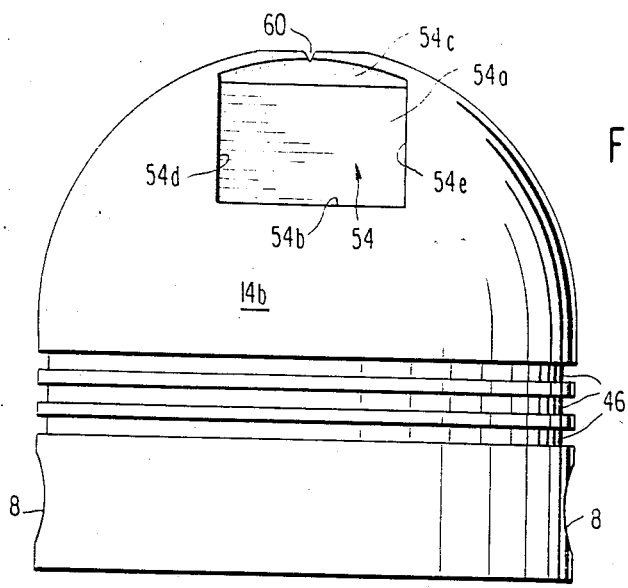
FIG. 2 is a side elevational view of the piston of the engine of FIG. 1 at 90° to the sectional view of that figure.
Figure 3:
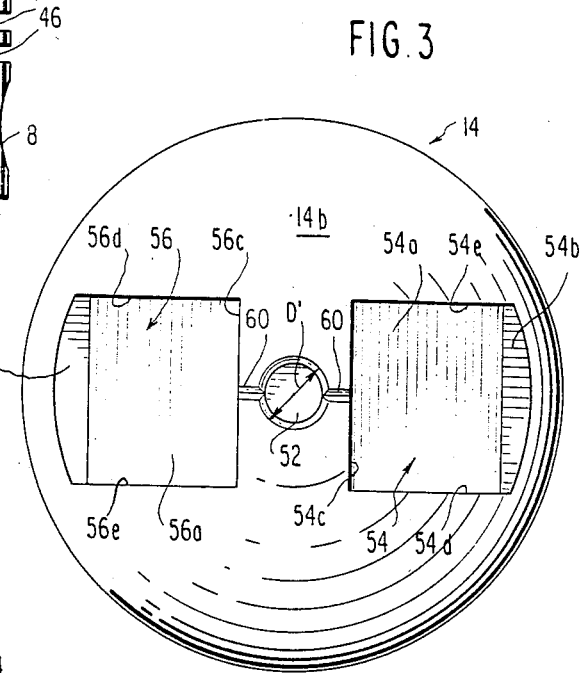
FIG. 3 is a top plan view of the piston of FIG. 2.

Referring first to FIGS. 1-3 inclusive, an overhead valve internal combustion engine of the spark ignition type is indicated generally at 10 and comprises one or more piston and cylinder assemblies including a cylinder indicated generally at 12 and a reciprocating piston indicated generally at 14 mounted for reciprocation therein. The cylinder 12 is comprised of a cylinder wall 16 defining a vertical axis 18 along which piston 14 reciprocates as indicated by the double arrow 20 in conventional fashion. The cylinder 12 is completed by cylinder head 22, the cylinder head being of semi-spherical form. Flange 16a of the cylinder wall 16 mates with flange 22a of the semi-spherical cylinder head 22. The cylinder head 22 is tight to the top of the cylinder wall 16, and may be bolted or otherwise detachably attached thereto by means (not shown). A gasket (not shown) may be positioned between the cylinder wall 16 and cylinder head 22, interposed between respective flanges 16a, 22a.

The semi-spherical cylinder head 22 terminates at its top in an integral, axially upwardly projecting, small diameter cylindrical portion 22b, having a threaded bore 24 and which enlarges at its upper end at 22c, forming a counterbore at 36. Threaded within bore 24 is a spark plug 28 bearing spaced electrodes 30, 31 at its bottom and being lockably and sealably mounted to the cylinder head by means of nut 32 and O-ring seal 34. The bore 24 defines a spark plug aperture 26 within the semi-spherical cylinder head 22 coaxial with cylinder wall 16. The cylinder head 22 is provided with two additional valve apertures at 38, 40 within which are positioned an intake and exhaust valve 42, 44, respectively, the valves having heads 42a, 44a which seat on the apertures 38, 40, in valve closed position as shown in FIG. 1.

As mentioned, the piston 14 reciprocates axially along axis 18 being driven by means of a connecting rod (not shown) mounted by way of a pin (not shown) via aligned circular holes 8 within skirt 14a of piston 14. The piston 14 terminates in a semi-spherical piston head or crown 14b which is slightly smaller than the semi-spherical cylinder head 22 with which it essentially mates when the piston 14 is in the top dead center position, as shown in FIG. 1. The skirt 14a of the piston is provided with a series of longitudinally spaced, circumferential grooves 46 within which are mounted piston rings 48 to seal off the volume between the piston head 14b and cylinder head 22. Piston rings 48 bear on the inner periphery of cylinder wall 16.

The piston head 14b inscribes, therefore, a substantial semi-spherical top corresponding in shape and being slightly smaller than the interior of the semi-spherical cylinder head 22. The improved combustion under extremely high compression ratios is achieved by maximizing the match between the semi-spherical cylinder head and that of the piston head, changing the explosion (burning) area from the top of the cylinder head to opposite sides of the cylinder head, utilizing a shallow groove to lead the burning gas from the spark plugs to dual explosion chambers defined principally by shallow recesses within the semi-spherical piston head opposite the intake and exhaust valves, and preferably forming the grooves of extended length to maximize the slowing of the burning gases. By slowing the burning process, the explosion process is retarded, and the explosion occurs with uniform and complete passage of the explosion wave from the point where the grooves joint the dual explosion chamber to the side opposite thereof, without separate, further ignition being initiated on the opposite side of the explosion chamber from the groove inlets to the same and thus the elimination of engine knocking.

Under such design, the semi-spherical head of the cylinder acts in conjunction with the similar semi-spherical piston head to constitute the "squish area" where the head of the piston approximates the head of the cylinder at all places except for the dual explosion chambers and the grooves leading from the spark plug area to the explosion or combustion chambers. Thus, the speed of the burning gases is slowed down by lengthening their travel route from the initial ignition (spark plug) area to the explosion chambers.

Specifically, the piston head 14 has a smooth, uninterrupted spherical surface over its complete extent except for three areas. The first, initial ignition area is defined by a small diameter circular recess 52 within the very top of the piston head 14 and coaxial with the piston, being sized slightly less than the spark plug aperture 26 within cylinder head 22. To opposite sides thereof and diametrically across from each other, there are very shallow rectangular plan configuration recesses 54, 56, within the semi-spherical piston head 14b which are sized slightly larger than the diameter of the heads 42a, 44a of the intake valve 42 and exhaust valve 44, respectively.

Referring to FIGS. 2 and 3, the recess 52 defining the spark plug area communicates via grooves 60 with the recesses 54, 56. The grooves 60 are of V-shaped cross-section but may be rectangular or U-shaped, as required.

Conventionally, as the piston 14 moves downwardly from its top dead center position, as shown in FIG. 1, opening of the inlet valve 42 permits a fuel-air mixture to enter the volume between the piston 14 and cylinder 12, induced to flow into this volume by the suction created as a result of the descending piston 14. With the inlet valve 42 closed, movement of the piston to top dead center position effects compression of the fuel-air mixture to a very high compression ratio. At or near top dead center of the piston 14, ignition occurs by the creation of a spark across the electrodes 30, 31 of spark plug 28. Only a very small amount of the fuel-air mixture, however, is in the initial ignition area A of the spark plug 52. The fuel-air mixture burns very slowly, and that flame is transferred from the initial ignition area A through the shallow grooves 60 and into the shallow combustion chambers C. By utilizing the construction and configuration of the cylinder head and piston, the speed of the burning gas is slowed down by lengthening their travel routes prior to complete combustion at the end of the explosion or combustion chambers C remote from the grooves 60.

Figure 4:
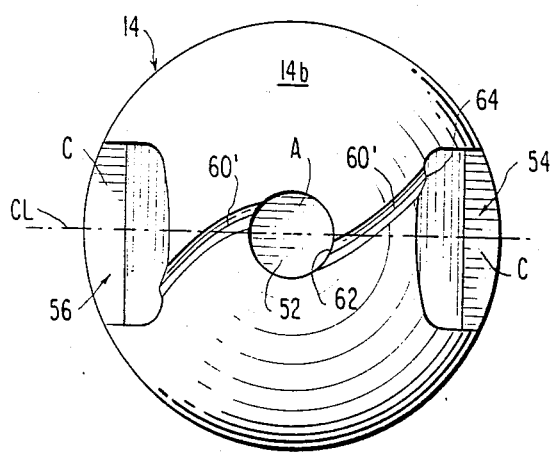
FIG. 4 is a top plan view of a piston of an alternate embodiment of the internal combustion engine of the present invention.
Figure 5:
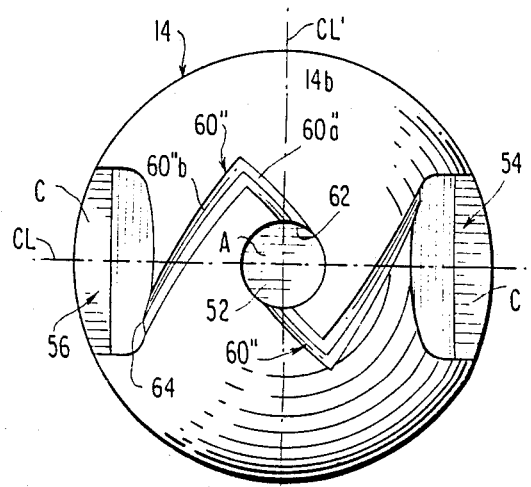
FIG. 5 is a top plan view of a piston of a further embodiment of the internal combustion engine of the present invention.

The grooves 60 may be of different length, depth and plan configuration. FIGS. 4 and 5 show alternate forms for the grooves joining the ignition area A to the combustion or explosion chamber C. In these embodiments, like elements have like numerical designations to those appearing in the first embodiment of FIGS. 1-3 inclusive.

In FIG. 4, the piston 14 surrounded by cylinder 16 is identical in all respects other than the shape and position of the grooves 60' leading from the spark plug recess 52 to recesses 54, 56 partially defining the combustion chambers C. Instead of being straight grooves on the center line bisecting the piston in the plane of center line CL, the grooves 60' are curved slightly and extend diagonally across and intersect the center line CL having one end opening to the recess 52 at 62, while their opposite ends 64 open to respective recesses 54, 56 at the diametrically opposite end of those recesses and the combustion chambers C partially defined thereby.

As a result, the embodiment of FIG. 4 increases significantly the travel time of the flame front as it passes from the initial ignition area A to the combustion chambers C.

With respect to FIG. 5, in this embodiment two right angle center lines CL and CL' intersect. It is noted that in this case the grooves, indicated generally at 60", are made of two parts 60"a and 60"b which are essentially at right angles to each other. Both parts are slightly curved, rather than being straight, and one end 62 of the grooves opens onto the circular recess 52 at center line CL', while the second leg 60"b opens to its respective combustion chamber C at 64, defined by recesses 54, 56, after passing through the right angle center line CL and at the end of the combustion chamber most remote from the portion of the recess 52 which communicates with end 62 of that same groove 60". The configuration taken by the grooves jointly, therefore, is of zigzag shape to further extend the time of the flame front emanating in the spark gap initial ignition area A prior to entering the combustion chambers C significantly slowing down the burning gases from the point of initial ignition to termination of ignition within recesses 54, 56, remote from the area A of initial ignition.

By further reference to the drawings, particularly the embodiment of FIGS. 1-3 inclusive, the improved performance of the internal combustion engine in accordance with the present invention may be appreciated, particularly the high compression ratio enjoyed, the lack of knocking and the advantageous use of dual combustion or explosion chambers, essentially sealed off from each other and the initial ignition area when the piston is at top dead center, except for the communication afforded by the narrow and shallow, preferably extended length groves leading from the initial ignition area A, within the piston head 14b and leading to the combustion chambers C defined by recessing the piston head as at 54, 56.

In that respect, recess 54a comprises an oblique plane surface 54a of laterally elongated, rectangular plan shape which surface is perpendicular to the axis 70 of intake valve 42 and parallel to the face of the head 42a of that valve. The recess 45a has a maximum depth d at its center and is further created by a horizontal bottom wall 54b, a vertical top wall 54c and vertical, right angle, lateral sidewalls 54d and 54e, FIG. 2. Correspondingly, recess 56 is defined by an oblique wall 56a, again of rectangular configuration in the illustrated embodiment, sized identical to that of wall 54a of recess 54, as are the balance of the walls making up the recess 56 to that of recess 54. Bottom wall 56b is horizontal and extends from wall 56a to the periphery of semi-spherical head 14b, vertical top wall 56c mirrors that of 54c of recess 54. Recess 56 is completed by laterally spaced, vertical sidewalls 56d and 56e, respectively. Further, oblique wall 56a is perpendicular to axis 72 of exhaust valve 44 and is parallel to the bottom face of exhaust valve head 54a. The maximum depth d of recess 56 matches that of recess 54. Thus, the dual combustion chambers C have equal volume. That volume is appreciably even though the combustion chambers are quite shallow. Adding to that volume is the volume created by recess 52 which is a circular groove of very shallow depth within the top of the piston head 14b and centered with the spark plug 28 and of a diameter D' generally equal to the diameter of bore 24 receiving the spark plug 28.

Assuming that the piston 14, at top dead center, essentially closes off the volume between the piston head 14b and the semi-spherical cylinder head 22, except for recesses 52, 54 and 56, and assuming that the volume of the grooves 60 are negligible and that recess 52 has a depth d', the total available combustion chamber volume with the piston at top dead center may be calculated. This calculation is effected by knowing the stroke S of the piston 14 from the partial showing of piston at 14' in dotted lines, the internal diameter of the cylinder 12 and the radius R which is the generatrix of the exterior surface of the piston head 14b and whose center lies on the center line 18 of the piston and cylinder assembly, and in the plane indicated by dotted line P which is the demarcation between the piston skirt 14a and the semi-spherical piston head 14b.

As may be seen in FIG. 1, with the piston at the top dead center position, the piston head 14b essentially seals off the combustion chambers C from the initial ignition area A, except through the narrow, shallow grooves 60 to insure that burning of the fuel and air mixture, initiated within the ignition area A, moves slowly through the grooves and the combustion chambers with the resulting elimination of knocking while maintaining the high compression ratios conventionally found in the internal combustion engines of the modern day automobiles.

As may be appreciated, while the invention is applicable to a single cylinder engine, conventionally a plurality of cylinders are employed with pistons reciprocating therein to provide compression, expansion, exhaust and intake or other strokes for a spark ignited internal combustion engine operating on a two stroke, four stroke, or other suitable cycle of operations. The present invention is characterized by the semi-spherical piston head 14 carrying all recesses defining an initial ignition area A and the combustion or explosion chambers C with the semi-spherical mating cylinder head 22 being unbroken except for the mounting of the intake and exhaust valves 42, 44 and the provision of valve head receiving apertures 38, 40 which function as intake and exhaust ports for the engine cylinders. The semi-spherical external surface of the piston head 14b is a surface of revolution having an axis normal to the plane P (where cylinder wall 12 joins the semi-spherical cylinder head 22).

The combustion of a fuel air mixture for an internal combustion engine normally results without explosion and burning of the fuel air mixture occurs when oxygen and gasoline particles are ignited after a spark plug ionizes the mixture. In the case of too high compression, the ionization goes too fast and in all directions so that the gas mixture burns instantly, constituting an explosion. The result is that something has to give and the weakest part is the aluminum cylinder head which gets punctured. Normally an explosion motor does not explode. The power of explosion motors depends of three variables: (1) the revolution per second (rotational velocity) of the motor; (2) the amount of compression of the gas when ignited; and (3) the amount of oxygen and gas particles in the chamber. Generally, the engine power increases as the rotational velocity increases. The power increases if the compression increases, but normally when it increases above a certain value, explosion occurs with more or less dramatic results. Thirdly, the power varies relative to the amount or quantity of oxygen and gas particles filling the combustion chambers which depends on (1) atmospheric pressure and (2) diameter of the intake valves. At high altitudes, the power normally decreases. Further, atmospheric pressure may be increased by compressing the air or by supercharging. This approach is expensive and is complicated.

With respect to the diameter of the intake valves, the diameter on a regular cylinder head is limited according to the diameter of the head. By using more than one valve, one increases the surface of the valve more or less considerably but makes it more complicated and expensive. The Hermi head or "pentroof" permits larger valves. This is very expensive. For instance, in the Mercedes Benz 300SL automobile of the past, the valves were not at the top but at the side of the cylinder. This worked well with leaded gas, but their use disappeared with the advent of leadfree gas.

The high powered engines of the past developed the hemispheric head to have the largest possible intake valve, thus getting the largest volume of gas mixture in the cylinder. As long as the high octane-leaded gas was available, the compression ratio increased from 6 to 1 to 7, 8, 9, 10 11+ to 1. When the leaded high octane 100+ disappeared, the compression of 8 to 1 or higher of the fuel air mixture caused explosion or small explosions which still burned the piston, only slower, known as "pings".

Relative to U.S. Pat. No. 2,826,185, previously discussed, and based on actual experience, it was apparent that with regular, non-hemi head engines, the compression gets raised by building a "squish" in the head by building a cylinder head. With a raised small area, the piston when rising to the top, squeezes the gas in that area, forcing it to flow very quickly to the more raised area, causing the mixture of gas to flow very fast and slowing down the burning, despite the higher resulting compression. As an example, the twelve cylinder Jaguar has a 12 to 1 compression ratio with a very peculiar head design which is non-hemi, while the Jaguar hemi-head engine has only an 8 to 1 ratio.

A compromise has resulted, and moderate engineers have observed that by building a shallow compression chamber by changing of the angle of the valves from 90-100° to 20°-30°, there is an increase in compression. At the same time, by increasing the number of valves to four, there is an increase in the diameter of gas intake, and the result is an increase in the compression ratio to 10 to 10½ to 1, and the horsepower up to 80 Hb to 1000 cc. However, one could not build a squish in the cylinder head and the valve diameter was still only moderate. It should be noted that at the same time the average American motor power is only 40-50 Hb per flash 1000 cc, and that the engine utilizes the old fashioned head with small intake valves.

In such spark ignition engines, the spark ignites the gas, not at the top of the piston's dead center since the speed of the piston would cause a late ignition since the spark first causes ionization, then the flame. Therefore, ignition occurs before the piston reaches top dead center so that when at the top the burning takes place and the effect is to utilize all the available power of the engine as a result of combustion. The now computerized ignition devices control pre-ignition by adjusting the timing of the spark. By prolonging the path of the ionized gas and following flame, one may raise the compression higher within the Hp.

With respect to the shape of the compression chamber, resulting in the present invention, and based on the appreciation of the above, by increasing the compression ratio within special additives to the gas/alcohol, benzol no etc., one reaches the limit of explosion. By realizing that we have very fast flowing gases of unknown but more or less supersonic speeds, the physical rules are not firm. The applicant has determined that by making the compression chamber other than round or oval, but angular with four or more angles, one may be able to speed up the gas molecules and decreases the chance of explosion at high compression, the invention is based on angulated compression chambers and the inclusion of an irregular base of a chamber by building small raised areas.

Thus, the advantages of the present invention are the utilization of a hemispheric head, large or even larger than normal multiple valves, the incorporation of squish, the use of multiple combustion chambers, the flattening of the combustion chambers and the use of higher than normal compression ratios without attendant explosion.

While the grooves 60, 60' and 60" have been shown as being essentially V form in transverse cross-section, they may be rectangular in cross-section or of U-shape. Further, while the grooves have been shown as lying on the center plane of the piston and taking the shortest possible path between the initial ignition area A and the combustion chambers C, they may lie in opposite oblique positions intersecting the center plane as slightly modified straight line grooves and opening to respective diametrically opposite sides of the initial ignition area A recess 52 and the combustion chamber C recesses 54, 56. Alternatively, they may be of zigzag configuration formed by essentially right angle linked branches. Various other changes and modifications may be made to further extend the length of the grooves and retard the completion of the burning or explosion process.

As may be appreciated, while the spark plug is shown at the top of the cylinder head and in axial alignment with the cylinders, it may be just as readily positioned to the side of the cylinder head (as accomplished, for example, in the single cam shaft Mercedes automobile). In this case, the recesses 54, 56 within periphery of the piston head 14b may remain as shown with a shifting of both the initial ignition area A defining recess area 52, so as to face the spark plug, and with the slots 60, 60, 60" shifted to make the shallow groove connections between that area and the combustion chambers C.

What is claimed is:

1. In a spark-ignition, overhead valve type internal combustion engine comprising:
   a cylinder closed at the top by a semi-spherical cylinder head,
   a piston reciprocating within said cylinder with said piston, cylinder and cylinder head defining at least one combustion chamber,
   and wherein said cylinder head includes an intake valve aperture, an exhaust valve aperture, and a spark plug aperture,
   a spark plug within said spark plug aperture,
   an intake valve and an exhaust valve mounted for reciprocation within said intake valve aperture and said exhaust valve aperture, respectively, with said valves having heads seated on said apertures and opening towards said piston,
   the improvement wherein said piston terminates in a crown of semi-spherical configuration sized slightly smaller than said cylinder head and forming a squish area over its semi-spherical surface with said semi-spherical cylinder head,
   a pair of shallow, first recesses having side walls all extending within said piston crown, on opposite sides of said spark plug aperture and said spark plug, forming dual combustion chambers,
   a shallow, second recess within said piston crown aligned with and facing said cylinder head spark plug aperature forming an initial ignition area having a depth less than that of said first recesses, and
   means for slowing burning of a charge to retard duration of explosion and eliminate knock, said means including a pair of oppositely directed shallow, narrow grooves within said piston crown having a cross-section substantially less than that of said recesses and extending from said initial ignition area second recess to said shallow combustion chamber defining first recesses;
   whereby the charge of a fuel and air mixture entering through the inlet valve which is compressed to a relatively high compression ratio contained within the combustion chambers, the initial ignition area, and the shallow, narrow grooves with the piston at top dead center, whereupon ignition thereof a burning process resulting therefrom must pass through the shallow, within the initial ignition area, narrow grooves and thence through the combustion chambers.

2. The spark-ignition, internal combustion engine as claimed in claim 1, wherein said shallow, first recesses within said piston crown are of generally rectangular plan configuration and are of a width and height on the order of the diameter of the valve heads and are aligned with and opposite said intake valve and said exhaust valve, respectively.

3. The spark-ignition, internal combustion engine as claimed in claim 2, wherein each said shallow, first recess forming said combustion chambers has an oblique plane surface which is perpendicular to the axis of the valve opening to that recess and parallel to the face of the head of that valve, a horizontal bottom wall, and vertical, right angle lateral sidewalls.

4. The spark-ignition, internal combustion engine as claimed in claim 3, wherein each said shallow, first recess forming a combustion chamber further comprises a vertical top wall extending from said oblique plane surface to the semi-spherical periphery of said piston crown.

5. The spark-ignition, internal combustion engine, as claimed in claim 4, wherein the maximum depth of each said first recess defining a combustion chamber, at its center, is slightly in excess of the extent of projection of the intake and exhaust valves outwardly of said cylinder head valve aperture in the direction of the piston crown.

6. The spark-ignition, internal combustion engine, as claimed in claim 5, wherein said shallow, second recess defining said initial ignition area and said shallow, first recesses to opposite sides thereof defining said combustion chambers, are on the center plane of the piston crown, and wherein said shallow, narrow grooves extend along said center plane in straight line fashion from said shallow, second recess defining said initial ignition area to said shallow, first recesses forming said dual combustion chambers.

7. The spark-ignition, internal combustion engine as claimed in claim 6, wherein said second recess defining said initial ignition area and said first recesses defining said combustion chambers are disposed on the center plane of said piston crown, and said shallow, narrow grooves are oblique to and intersect said center plane, and open to diametrically opposite sides of said recess defining said initial ignition area and respective said combustion chambers in diametrically opposite directions.

8. The spark-ignition, internal combustion engine as claimed in claim 7, wherein said shallow, narrow grooves comprise essentially linked right angle branches forming a joint communication path between said initial ignition area defining second recess and said combusion chamber first recesses, and wherein said branches open at opposite ends to diametrically opposed sides of said second recess forming said initial ignition area and the pair of first recesses forming said combustion chambers to opposite sides of said piston crown center plane.

* * * * *

UNITED STATES PATENT AND TRADEMARK OFFICE
CERTIFICATE OF CORRECTION

PATENT NO. : 4,669,431

DATED : June 2, 1987

INVENTOR(S) : Dr. Stephen Simay

It is certified that error appears in the above-identified patent and that said Letters Patent is hereby corrected as shown below:

Column 1, Line 36, delete "is";

Column 8, Line 56, delete "no" and insert --,--;

Column 9, Line 31, delete "60,60," and insert --60, 60',--;

Column 10,. Claim 7, Line 55, delete "respective said" and insert --said respective--;

IN THE ABSTRACT, Line 7, delete "apertures" and insert

--aperture--;

Line 7, delete "chamber" and insert --chambers--

Signed and Sealed this

Eighth Day of December, 1987

Attest:

DONALD J. QUIGG

Attesting Officer

Commissioner of Patents and Trademarks